(12) United States Patent
Zhou et al.

(10) Patent No.: US 6,310,879 B2
(45) Date of Patent: Oct. 30, 2001

(54) METHOD AND APPARATUS FOR MULTICAST OF ATM CELLS WHERE CONNECTIONS CAN BE DYNAMICALLY ADDED OR DROPPED

(76) Inventors: Fan Zhou, 120 Aberdeen Dr., Cranberry, PA (US) 16066; Jon C. R. Bennett, 1915 Ridge Rd. Ext., Ambrigde, PA (US) 15003

( * ) Notice: Subject to any disclaimer, the term of this patent is extended or adjusted under 35 U.S.C. 154(b) by 0 days.

(21) Appl. No.: 08/851,881

(22) Filed: May 6, 1997

Related U.S. Application Data

(63) Continuation-in-part of application No. 08/330,381, filed on Oct. 27, 1994, now Pat. No. 5,875,189, which is a continuation-in-part of application No. 08/305,576, filed on Sep. 14, 1994, now Pat. No. 5,528,588.

(51) Int. Cl.[7] .................................................. H04L 12/56
(52) U.S. Cl. ........................... 370/397; 370/412; 370/432
(58) Field of Search ..................................... 370/389, 395, 370/396, 390, 412, 413, 415–419, 428, 429, 432, 260; 709/204, 226

(56) References Cited

U.S. PATENT DOCUMENTS

| 5,103,444 | * | 4/1992 | Leung et al. | 370/432 |
|---|---|---|---|---|
| 5,291,477 | * | 3/1994 | Liew | 370/238 |
| 5,416,770 | * | 5/1995 | Stoner et al. | 370/390 |
| 5,469,438 | * | 11/1995 | Baumert et al. | 370/432 |
| 5,612,959 | * | 3/1997 | Takase et al. | 370/390 |
| 5,633,869 | * | 5/1997 | Burnett et al. | 370/396 |
| 5,657,327 | * | 8/1997 | Hamada et al. | 370/389 |
| 5,862,329 | * | 1/1999 | Aras et al. | 370/260 |
| 5,867,653 | * | 2/1999 | Aras et al. | 370/260 |
| 5,892,767 | * | 4/1999 | Bell et al. | 370/432 |
| 5,899,699 | * | 5/1999 | Kamiya | 370/432 |

\* cited by examiner

*Primary Examiner*—Laura S. Rao
(74) *Attorney, Agent, or Firm*—Ansel M. Schwartz

(57) ABSTRACT

The present invention pertains to a multicast system. The system comprises an ATM network. The system comprises a source connected to the ATM network. The system also comprises a first destination connected to the ATM network. The system comprises at least a second destination connected to the ATM network. Additionally, the system comprises a mechanism for adding or dropping connections dynamically between the first source and any destinations at any time. The present invention pertains to a method for multicasting ATM cells. The method comprises the steps of forming a first connection between a first source and a first destination for transmitting a first ATM cell therebetween. Next, there is be step of forming a second connection between the first source and a second destination while the first connection exists. Then there is the step of terminating the first connection while the second connection exists. The present invention pertains to a method for multicasting ATM cells. The method comprises the steps of forming a first connection between a first source and a first destination. Next there is the step of obtaining a first ATM cell to the transmitted out the first source. Next there is the step of forming a second connection between a first source and a second destination while the first connection exists and after the first ATM cell has been obtained.

7 Claims, 13 Drawing Sheets

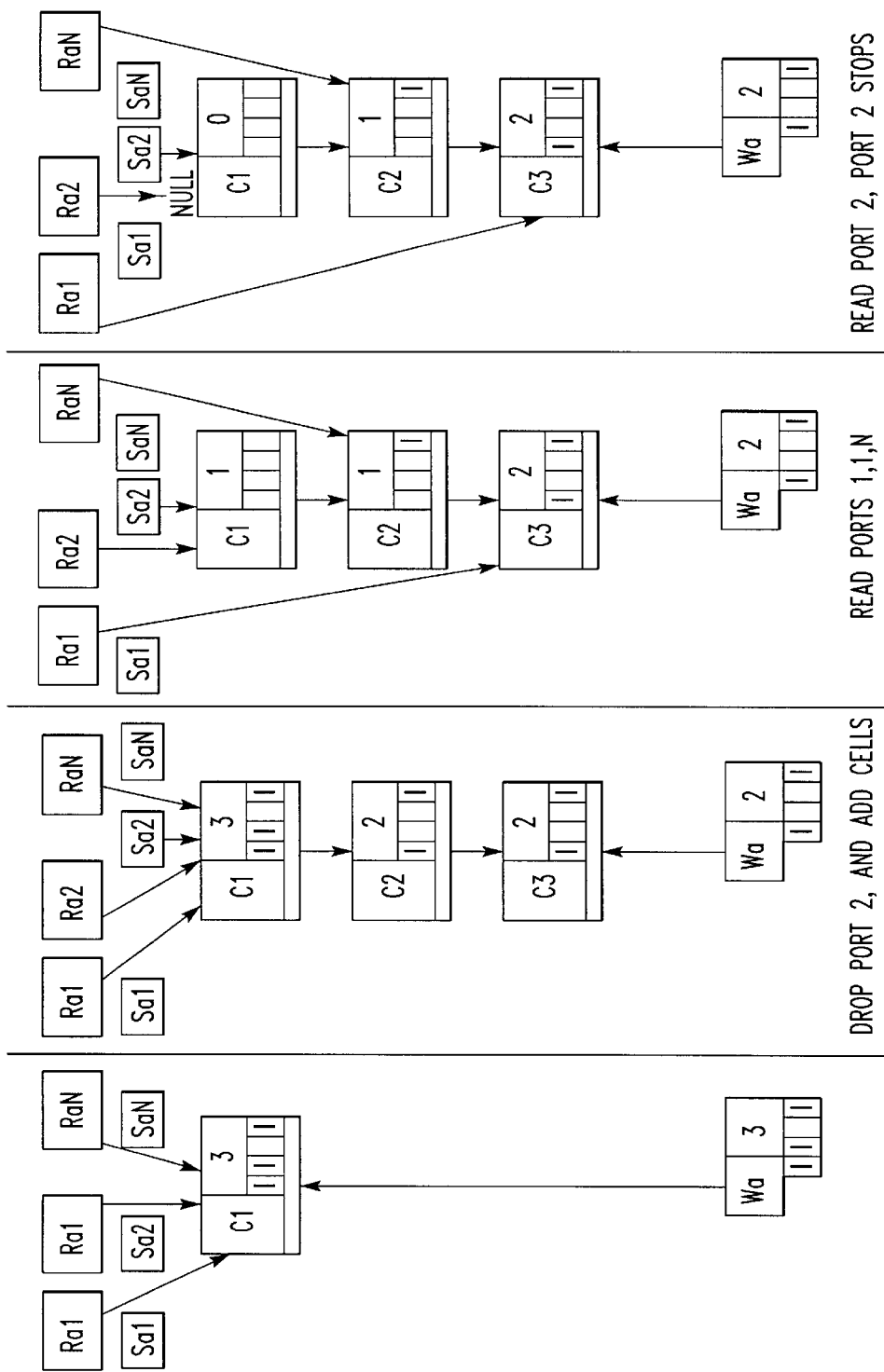

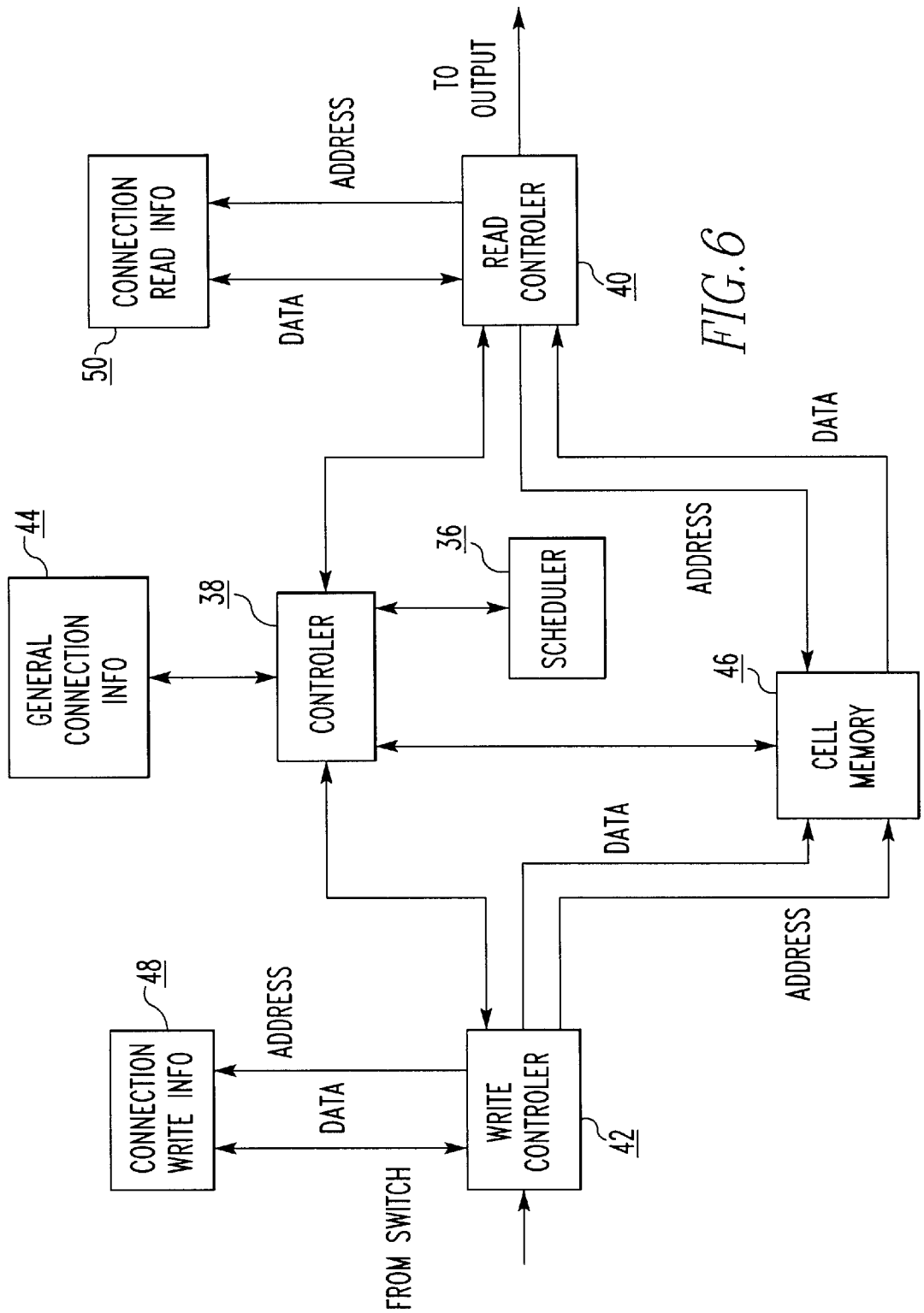

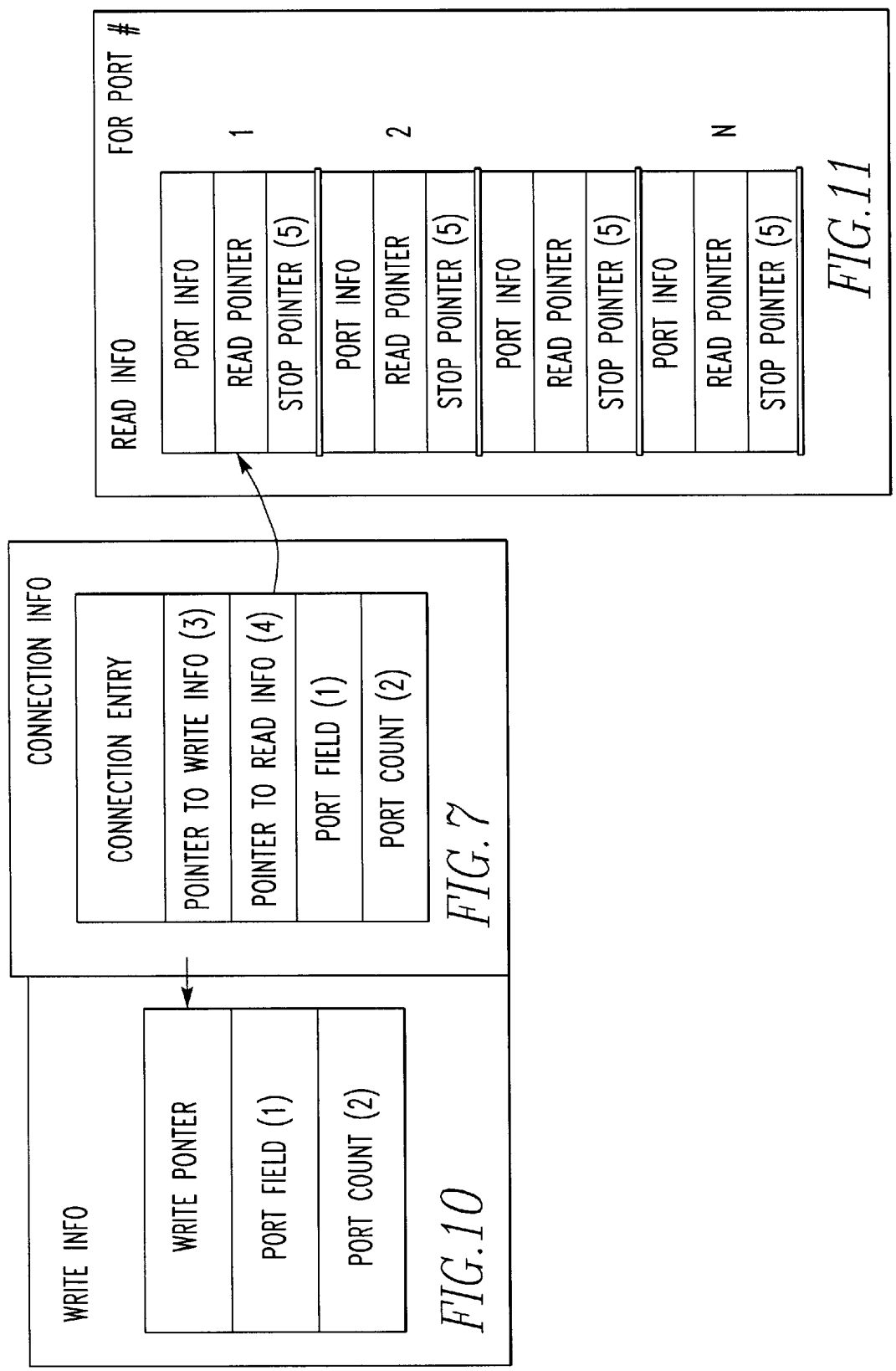

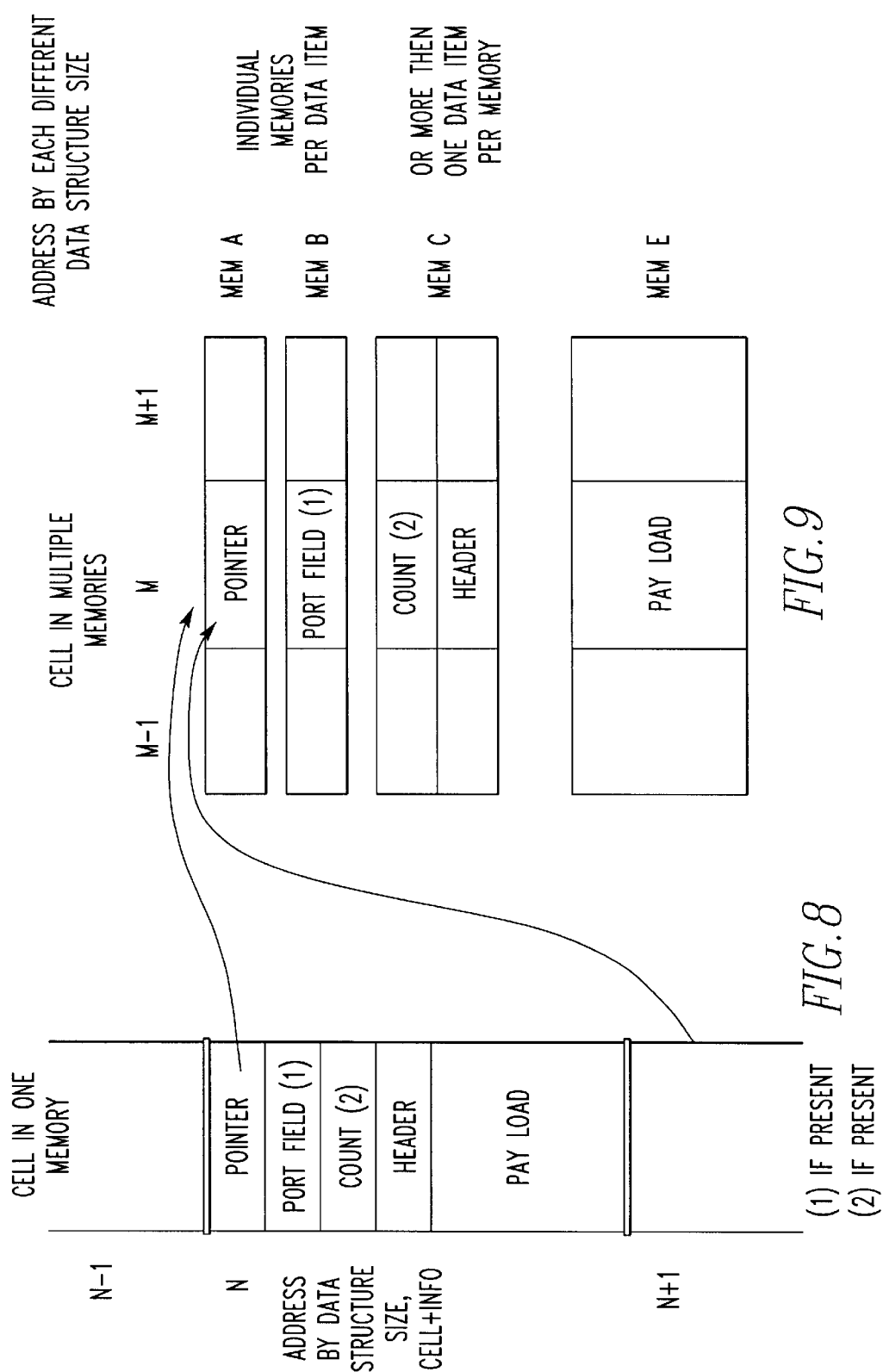

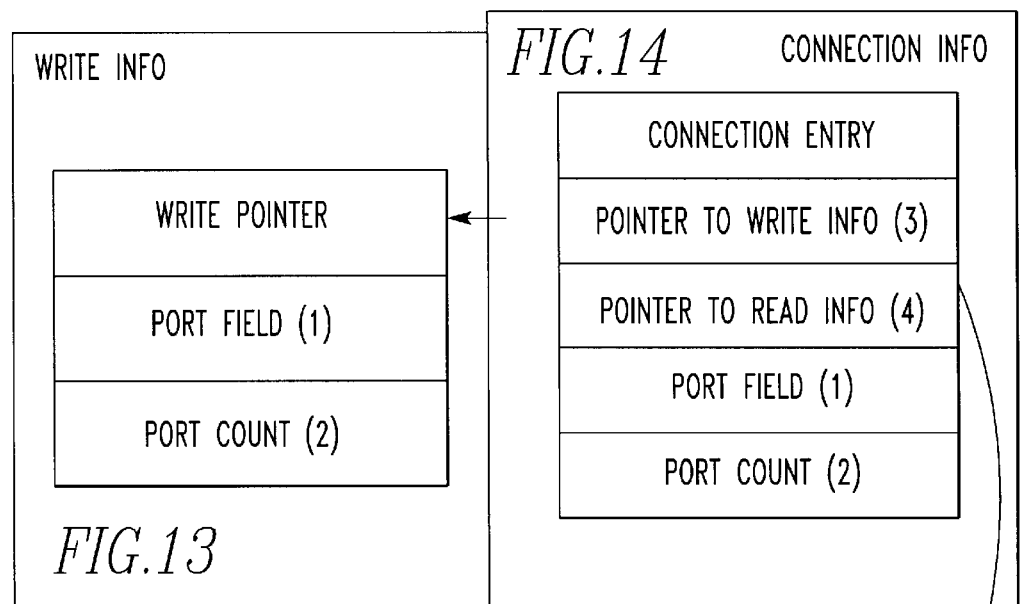
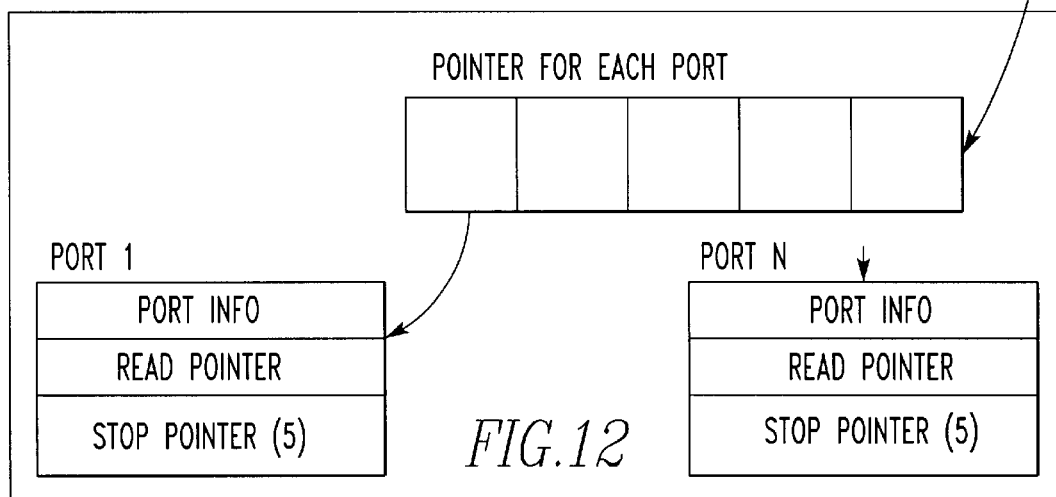

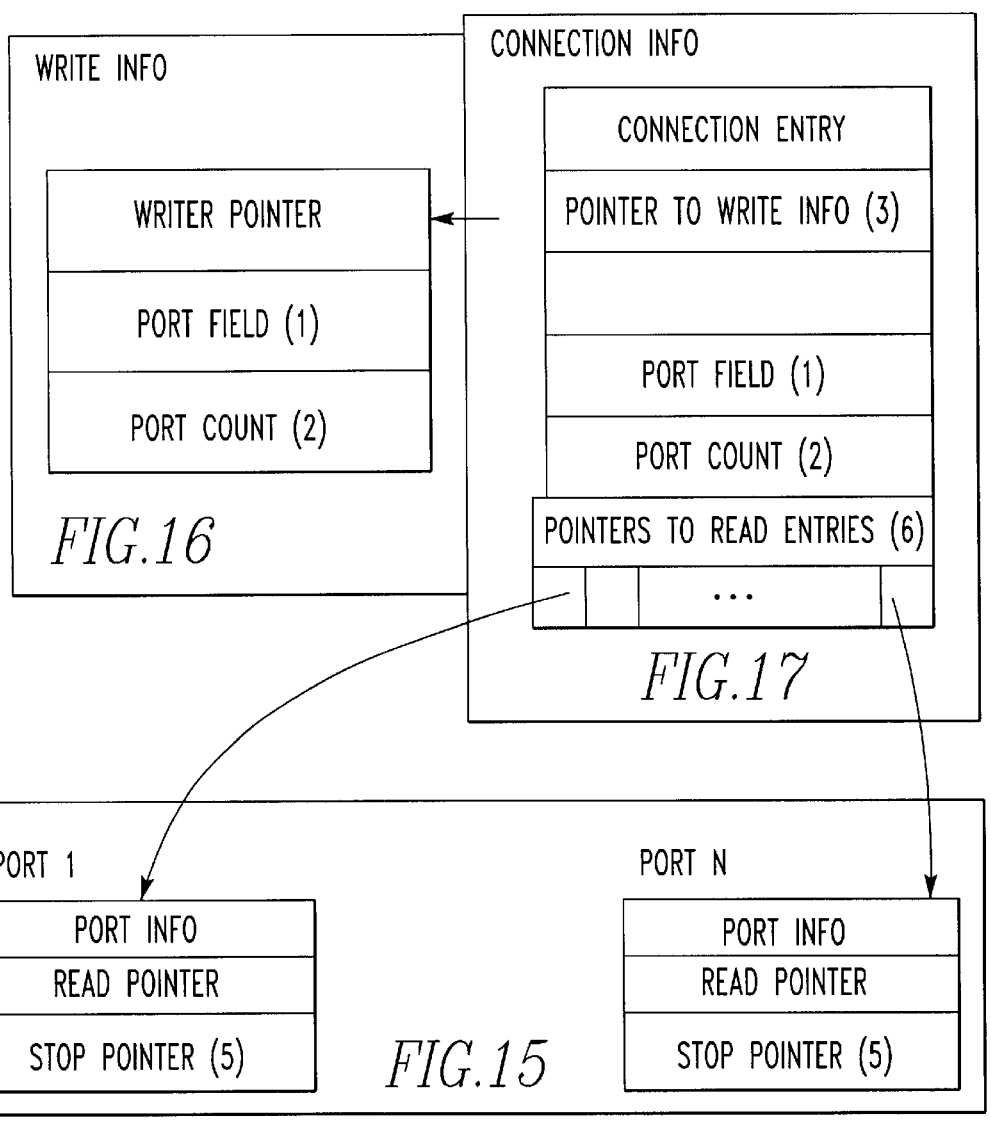

CONNECTION C1
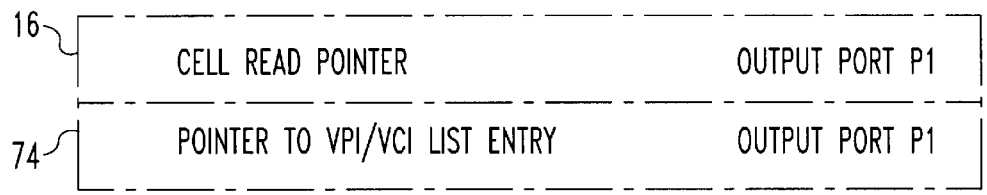
⋮
CONNECTION CN
⋮
*FIG.19*

| 68 NODE ADDRESS POINTER |
|---|
| 212 NEW VPI |
| 213 NEW VCI |
| 214 TERMINATING CONNECTION INDICATION BIT |
| 215 FINAL ENTRY IN LIST INDICATION BIT |

*FIG. 20*

METHOD AND APPARATUS FOR MULTICAST OF ATM CELLS WHERE CONNECTIONS CAN BE DYNAMICALLY ADDED OR DROPPED

CROSS-REFERENCE

This is a continuation-in-part of U.S. patent application Ser. No. 08/330,381 filed Oct. 27, 1994, now U.S. Pat. No. 5,875,189 which is a continuation-in-part of U.S. patent application Ser. No. 08/305,576 filed Sep. 14, 1994, now U.S. Pat. No. 5,528,588 issued Jun. 18, 1996.

FIELD OF THE INVENTION

The present invention is related to the multicast of ATM cells. More specifically, the present invention relates to the multicast of ATMs through the use of multiple ports or a single port to multiple addresses where connections can be dynamically added or dropped.

BACKGROUND OF THE INVENTION

ATM (asynchronous transfer mode) is used for communication purposes in integrated digital networks. Through these networks, ATM cells travel to desired destinations. Due to the complexity and demands on a network, there exists concerns involving traffic control in regard to cells in the network. Moreover, in multicast (i.e. the transmission of a single ATM cell to multiple destinations), considerations must be given to memory utilization in regard to the storage of a cell going to a multitude of locations. Ideally, as little memory as possible should be utilized to maintain the cell for all the different locations to which it will be sent. The present invention provides an efficient approach to providing a cell to a multiplicity of connections for multicast.

The multicast function can be limited to the act of causing an individual ATM cell to be transmitted by multiple output ports of an ATM switching system, or it may include causing an individual output port to transmit an individual ATM cell multiple times. In the former case, it is possible to restrict the use of connection addresses so that the instances of a multicast ATM cell transmitted at different output ports will all have the same address information (known as the VPI and VCI). In the latter case, it is necessary for each copy of a multicast ATM cell to have a different VPI and/or VCI to indicate that each copy of the cell should be sent to a different final destination. The prior art for performing multicast in an ATM switch using multiple VPI/VCIs is to create and store multiple copies of the cell at some point within the ATM switching system.

Furthermore, a multicast VC (virtual connection) broadcasts the same packet to M destinations where M>1. It might travel through a number of intermediate nodes/switches before reaching the destinations. At each node, the intermediate VC might broadcast to more destinations generating a dynamic multicast graph as shown below. Each node might add or drop destinations/ports at any time. For example, a party can drop or add to a video conference call at any node any time. For instance, the port addition/drop mechanism implemented in the Series-C/Altantis netmods has severe flaws such as: Cells cannot be freed when a connection has been dropped (Series-C); The last cell of a multicast connection is reserved and is never freed (Series-C and Atlantis); not robust, i.e, misbehaves when adding a port to an existing port; and costly (per-port drop 16-bit pointer).

A mechanism which supports dynamic automatic destination (port) addition and drop would reduce the software interference and improve the system performance.

However, multicast VC frees cell at the speed of the slowest port since it frees a cell until all ports are served for that cell. This dramatically increases the size of the multicast buffer. A mechanism which supports cell discard based on selective ports would reduce multicast queue size and recover from the potential congestion and cell loss quickly, which further improves the performance of multicast VC.

The present invention relates to an efficient method and apparatus for multicasting a cell while preferably using different VPI/VCIs for each instance of the transmission of that cell and being able to add or drop connections from a conference or a broadcast at any time. The multiple transmissions of the cell can occur on the same output port or different output ports of an ATM switching system.

SUMMARY OF THE INVENTION

The present invention pertains to a multicast system. The system comprises an ATM network. The system comprises a source connected to the ATM network. The system also comprises a first destination connected to the ATM network. The system comprises at least a second destination connected to the ATM network. Additionally, the system comprises a mechanism for adding or dropping connections dynamically between the first source and any destinations at any time.

The present invention pertains to a method for multicasting ATM cells. The method comprises the steps of forming a first connection between a first source and a first destination for transmitting a first ATM cell therebetween. Next, there is be step of forming a second connection between the first source and a second destination while the first connection exists. Then there is the step of terminating the first connection while the second connection exists.

The present invention pertains to a method for multicasting ATM cells. The method comprises the steps of forming a first connection between a first source and a first destination. Next there is the step of obtaining a first ATM cell to the transmitted out the first source. Next there is the step of forming a second connection between a first source and a second destination while the first connection exists and after the first ATM cell has been obtained.

The present invention pertains to a linked list for multicast in an ATM network. The linked list comprises a first cell. The linked list also comprises a plurality of read pointers. Each read pointer is associated with a port. Each read pointer points to the first cell.

The present invention also pertains to a multicast system for an ATM network. The system comprises a first port through which a cell passes. The system also comprises a first read pointer associated with the first port. The multicast system additionally comprises at least a second port through which the cell passes. There is at least a second read pointer associated with the second port. The multicast system is comprised of a cell to which each read pointer points. Furthermore, the multicast system is comprised of a controller for controlling when a read pointer reads a cell. The system preferably includes a plurality of cells. Each cell has a cell pointer pointing to a next cell. The plurality of cells forms a linked list. The controller points a read pointer to the next cell after the cell the read pointer was pointing to is read.

The present invention additionally pertains to a method for multicasting. The method comprises the steps of forming a first read pointer and at least a second read pointer. Each read pointer corresponds to a first port and a second port, respectively. Each read pointer points to a cell. Then there is the step of choosing a port. Next there is the step of locating the read pointer for the port. Then there is the step of reading the cell to which the read pointer is pointing. Preferably, the cell includes data and the cell includes a cell pointer pointing to a second cell, if there is a second cell. The first cell and at least the second cell forms a linked list.

The present invention pertains to a multicast system for an ATM network. The multicast system comprises at least a first ATM cell pointer mechanism. The multicast system is also comprised of at least a first cell having data. The first ATM cell pointer mechanism points to the first ATM cell. The multicast system is additionally comprised of a first node having a first address for the first ATM cell and a node address pointer. The first ATM cell pointer mechanism points to the first node. The multicast system is comprised of a second node having a second address for the first ATM cell. The node address pointer of the first node points to the second node. The first and second nodes form a linked list of addresses. The multicast system preferably is also comprised of a controller in communication with the first ATM cell pointer mechanism, the first node and the second node. The controller causes the first ATM cell to be transmitted out a port to the first address and then to the second address.

The present invention pertains to a method for multicasting an ATM cell. The method comprises the steps of reading a first node having a first address to which a first ATM cell is to be sent. Then there is the step of transmitting the first ATM cell out a port to the first address. Next there is the step of reading a second node having a second address to which the first ATM cell is to be sent. Then there is the step of transmitting the first ATM cell out the port to the second address.

The present invention pertains to a method for multicasting ATM cells. The method comprises the steps of reading a first ATM cell to which a first cell read pointer is pointing. Then there is the step of transmitting the first ATM cell out a first port to a first address. Next there is the step of determining whether the first ATM cell is to be transmitted out the first port to a second address. Next there is the step of reading a cell pointer pointing to a second ATM cell if the transmission of the first ATM cell out the first port to addresses is completed.

The present invention pertains to a multicast system for an ATM network. The multicast system is comprised of a first ATM cell pointer mechanism associated with a first port. The multicast system also comprises at least a second ATM cell pointer mechanism associated with a second port. The multicast system is also comprised of at least a first ATM cell. The first ATM cell pointer mechanism and the second ATM cell pointer mechanism points to the first ATM cell. There is a first node having a first address and a node address pointer. The first ATM cell pointer mechanism points to the first node. There is a second node having a second address. The node address pointer of the first node points to the second node. The first and second nodes form a linked list of addresses. The first ATM cell preferably has a cell pointer. The multicast system preferably includes a second ATM cell. The cell pointer of the first ATM cell points to the second ATM cell. The first ATM cell and second ATM cell forms a linked list of ATM cells. The multicast system can include a controller for controlling when a pointer is read and when an ATM cell is transmitted out a port and with which address. The controller is in communication with the nodes, cells and pointers. The multicast system preferably also includes a write pointer pointing to a last ATM cell in the linked list of ATM cells.

Preferably, for each ATM connection, a linked list of VPI/VCIs is stored for each output that transmits that connection. A cell is transmitted by a given output one time for each entry in the VPI/VCI list, with each transmission using the VPI/VCI stored in the current entry in that list. When the end of the VPI/VCI list is reached, reading of the current ATM cell has been completed for that output port and reading of the next ATM cell for that connection and output port begins at the beginning of the VPI/VCI list.

A VPI/VCI list requires a series of pointers. For each output port of each connection, there is a pointer to VPI/VCI list to point to the current entry in the appropriate VPI/VCI list. Whenever a cell is read, the pointer to VPI/VCI list points to the entry from which the VPI/VCI is taken and used as the VPI/VCI of the transmitted cell. Each time a cell is read, the pointer to VPI/VCI list is updated to point to the next entry in the VPI/VCI list.

One of the entries in the VPI/VCI list is designated as the final entry. Once the final entry is reached, the cell being read has been sent to every VPI/VCI and that cell is no longer read by the given output port. When the next read takes place for the given connection and output port, the next cell for that connection is sent.

The innovation provides the following benefits.

It allows a cell to be transmitted multiple times to either the same output port or different output ports and allows each transmission of the cell to occur with a different VPI/VCI.

It allows a cell to be multicast to multiple VPI/VCIs without requiring that multiple copies of the cell be stored at any point in an ATM switching fabric, which saves both the memory space and the bandwidth needed to store multiple copies of a cell.

It allows for the list of VPI/VCIs for a given output of a connection to be modified without disrupting the flow of cells for that connection.

BRIEF DESCRIPTION OF THE DRAWINGS

In the accompanying drawings, the preferred embodiment of the invention and preferred methods of practicing the invention are illustrated in which:

FIG. 2, FIG. 3, FIG. 4 and FIG. 5 are schematic representations of a linked list under dynamic operation.

FIG. 6 is a schematic representation of a multicast system for an ATM network.

FIGS. 7, 14 and FIG. 17 are schematic representations of a general connection information memory.

FIG. 8 and FIG. 9 are schematic representations of a cell memory.

FIG. 10, FIG. 13 and FIG. 16 are schematic representations of a connection write information memory.

FIG. 11, FIG. 12 and FIG. 15 are schematic representations of a connection read information memory.

FIG. 19 shows the contents of the connection pointer information. For each output port of each connection, there exists a cell read pointer to point to the current cell being read from the ATM cell buffer, as well as a pointer to VPI/VCI list to point to the VPI/VCI list entry that should be used when the next cell read takes place for the given connection and output port.

FIG. 20 shows the contents of a VPI/VCI list entry. The pointer to the next entry is used to point to the next entry (and thus the next VPI/VCI in a set of VPI/VCIs) that should be used when reading a cell. The terminating connection indication bit is set to indicate that both the new VPI and new VCI should be included in the cell being read (if it is not set, the new VPI is still included but the new VCI is not inserted into the cell being read). The final entry in the VPI/VCI list indication bit is set to indicate that the current VPI/VCI entry is the last entry in the list and thus that the multicast to multiple VPI/VCIs has been completed for a given ATM cell.

DESCRIPTION OF THE PREFERRED EMBODIMENT

Figure 1:
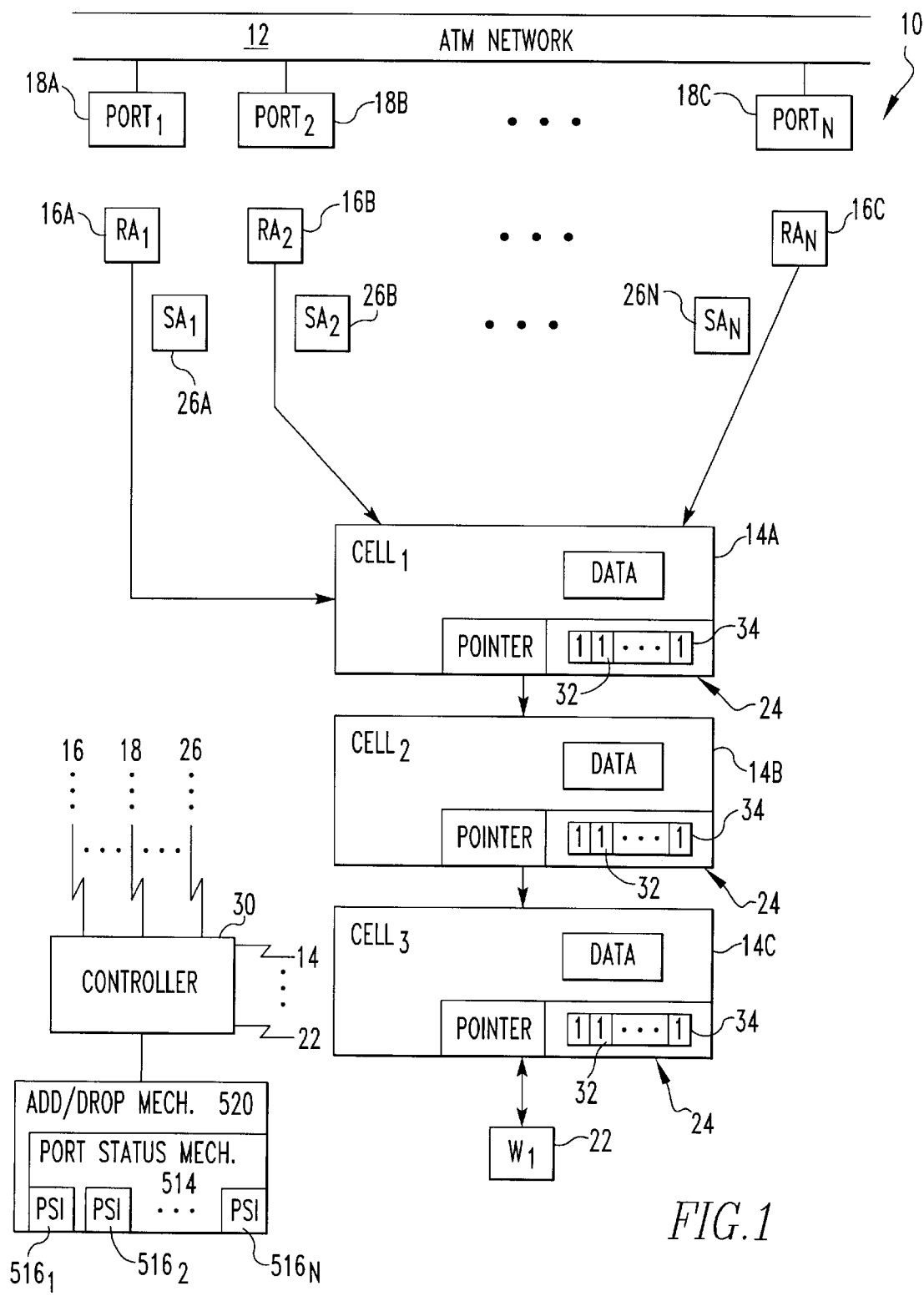
FIG. 1 is a schematic representation a system for multicast in an ATM network showing a linked list.

Referring now to the drawings wherein like reference numerals refer to similar or identical parts throughout the several views, and more specifically to FIG. 1 thereof, there is shown a linked list 10 for multicast in an ATM network 12. The linked list 10 comprises a first cell 14. The linked list 10 also comprises a plurality of read pointers 16. Each read pointer 16 is associated with a port 18. Each read pointer 16 points to the first cell 14. A port 18, for purposes herein, can mean a port internal to a switch, such as a stage of the switch, or an external port of a switch.

Preferably, the linked list 10 includes at least a second cell 14b and wherein each cell 14 includes a cell pointer 20 pointing to a next cell 14, unless it is a last cell 14c. Preferably, each cell 14 includes data. If minimizing the difficulty of maintaining the read pointer (bandwidth) is more important than memory utilization, then the last cell 14c is not freed, but is maintained. This allows the read pointer to remain established and not have to be possibly rewritten each time a new linked list 10 is formed. If utilization is more important to the overall architecture then the last cell 14c can be freed.

Preferably, the linked list 10 includes a write pointer 22 pointing to the last cell 14c. Each cell 14 can also include a count 24 which identifies all ports 18 the cell 14 will be sent out. The list 10 can also include a stop pointer 26 corresponding with each read pointer 16. The stop pointer 26 identifies the last cell to be sent out of a corresponding port 18.

The present invention also pertains to a multicast system 28 for an ATM network 12. The system 28 comprises a first port 18a through which a cell 14 passes. The system 28 also comprises a first read pointer 16a associated with the first port 18a. The multicast system 28 additionally comprises at least a second port 18b through which the cell 14 passes. There is at least a second read pointer 16b associated with the second port 18b. The multicast system 28 is comprised of a cell 14 to which each read pointer 16 points. Furthermore, the multicast system 28 is comprised of a controller 30, as shown in FIG. 6, for controlling when a read pointer 16 reads a cell 14. The system 28 preferably includes a plurality of cells 14. Each cell 14 has a cell pointer 20 pointing to a next cell. The plurality of cells 14 forms a linked list 10. The controller 30 points a read pointer 16 to the next cell 14 after the cell 14 the read pointer 16 was pointing to is read.

Preferably, the system 28 includes means or a mechanism for pointing to a last cell 14c in the linked list 10. The means or mechanism for pointing to the last cell 14c in the linked list 10 is a write pointer 22. Preferably, each cell 14 has a count 24 which identifies all ports 18 the cell 14 will be sent out. The controller 30 preferably removes a port 18 from the count 24 after the cell 14 the read pointer 16 is pointing to is read. Additionally, the system 28 preferably includes a stop pointer 26 corresponding with each read pointer 16. The stop pointer 26 identifies the last cell 14c that will be sent out the port 18. The controller 30 frees the cell 14 if there is no other port 18 the cell 14 will be sent out and no ports 18 in the count 24 unless it is the last cell 14c in the linked list 10.

The present invention additionally pertains to a method for multicasting. The method comprises the steps of forming a first read pointer 16a and at least a second read pointer 16b. Each read pointer 16 corresponds to a first port 18a and a second port 18b, respectively. Each read pointer 16 points to a cell 14. Then there is the step of choosing a port 18. Next there is the step of locating the read pointer 16 for the port 18. Then there is the step of reading the cell 14 to which the read pointer 16 is pointing. Preferably, the cell includes data and the cell 14 includes a cell pointer 20 pointing to a second cell 14b, if there is a second cell 14b. The first cell 14 a and at least the second cell 14b forms a linked list 10.

After the reading step, there is preferably the step of pointing the read pointer 16 to the second cell 14b pointed to by the cell pointer 20 of the cell 14a. After the reading step, there can also be the step of sending the cell 14a out of the port 18a. After the pointing step, there can be the step of checking whether there is at least one other port 18 through which the cell 14a will be sent out. After the checking step, there can be the step of freeing the cell 14a if there is no other port 18 the cell 14a will be sent out.

Preferably, the cell 14 includes a count 24 which identifies all ports 18 the cell 14 will be sent out. Preferably, after the sending step, there is the step of removing from the count 24, the port 18a. The freeing step then includes the step of freeing the cell 14a if there is no other port 18 the cell will be sent out and there are no other ports 18 in the count 24 and the cell 14 is not the last cell 14c in the linked list 10.

After the pointing step, there can be the step of reading the second cell 14b to which the pointer 16a is pointing. The removing step can include the step of decrementing by one a value of the count 24 equal to the number of ports 18 the cell 14 will be sent out.

The checking step can include the step of preparing a stop pointer 26 value for the port 18 with a right pointer value 22 for the port 18. The right pointer 20 points to a last cell 14c to be sent out the port 18. Alternatively, after the pointing step, there can be the step of clearing a bit 32 corresponding to the port 18 from a status field 34 of the cell 14. The freeing step then includes the step of freeing the cell 14 if the status field 34 is empty and the value of the count 24 is equal to 0, and the cell 14 is not the last cell 14c in the linked list.

In an alternative embodiment, the method for multicasting comprises the steps of choosing a port 18. Then there is the step of locating a read pointer 16 for the port 18. Next there is the step of reading a cell 14 to which the read pointer 16 is pointing. Next there is the step of sending the cell 14 out of the port 18. Then there is the step of removing from a count 24 which identifies all ports 18 the cell 14 will be sent out, the port 18. Next there is the step of pointing the read pointer 16 to a second cell 14b pointed to by a cell pointer 20 of the cell 14a if there is a second cell 14b. Then there is the step of checking whether there is at least one other port 18 the cell (14a) will be sent out. Next there is the step of freeing the cell 14a if there is no other port 18 the cell 14a will be sent out and there are no other ports 18 in the count 24, and the cell 14 (14a) is not the last cell 14c in the linked list 10.

After the pointing step, there can be the step of reading the second cell 14b to which the read pointer 16 is pointing. The checking step can include the step of comparing a stop pointer 26 value for the port 18 with a write pointer 22 value for the port 18. The write pointer 22 points to the last cell 14c to be sent out the port 18. Alternatively, after the pointing step, there can be the step of clearing a bit 32 corresponding to the port 18 from a status field 34 of the cell 14. The freeing step can then include the step of freeing the cell 14 if the status field 34 is empty and the value of the count 24 is equal to 0 and the cell 14 is not the last cell 14c of the linked list 10.

In the operation of an embodiment involving multiple cells, a cell C1 is introduced to the system 28. The read pointer Ra1, the read pointer Ra2 and the read pointer RaN corresponding to port 1, port 2 and port N, respectively, point to the cell C1. (The first subscript, for instance a, refers to the connection. The second subscript, for instance 1, refers to the port. Thus, $Ra_1$ refers to the read pointer associated with connection a and port 1.) The count 24 of cell C1 is set to 3 to correspond with the number of ports that will ultimately receive the cell C1 for output, and the status field 34 has bits 32 at corresponding locations which identify the ports to which the cell C1 will ultimately be sent out. Similarly, the write pointer Wa points to cell C1, which being the only cell 14 is the last cell 14c. The write pointer Wa has its count incremented to 3 to reflect the number of ports which receive the cell C1. Additionally, the write pointer Wa has its status field 34 which acts as a reference status field filled with corresponding bits for each port that the cell C1 will be sent out. See FIG. 2. In addition, the stop pointer Sa1, the stop pointer Sa2 and the stop pointer Sa3 which correspond to read pointer Ra1, read pointer Ra2 and read pointer RaN, respectively, do not point to anything since no port is in the process of being dropped.

For exemplary purposes, next, port 2 is dropped from reading any cells of linked list 10, and cells C2 and C3 are added to the link list 10 beginning with cell C1. When the cell C2 is added, the cell pointer 20 of the cell C1 points to the cell C2. Cell C2 has its count 24 incremented to 2 since there are two ports, port 1 and port N which cell C2 will go out. Similarly, cell C2's status field 34 has bits 32 introduced into the locations corresponding to the first port and the Nth port to identify that cell C2 will go out port 1 and port N. Additionally, the cell C2 has its cell pointer 20 pointing to cell C3. Cell C3 also has its count incremented to 2 and bits 32 introduced into the corresponding locations of its status field 34 for port 1 and port N. Furthermore, the read pointer Wa now points to cell C3 since cell C3 is the last cell 14c of the link list 10. The count of the read pointer Wa is changed to 2 since there are only two ports that the link list 10 having cells C1, C2 and C3 will go out and its reference status field has only two bits 32 in it corresponding to the location of port 1 and the location identified port N. Because the port 2 has been dropped before cells C2 and C3 have been added, they do not reflect the presence of port 2 at all. Cell C1 still reflects the presence of port 2 since port 2 was present at the time cell C1 was introduced to the system 28. Also, the stop pointer Sa2 is changed to point to cell C1 since Port 2 has been removed from reading any cells 14 of the linked list 10. Only when a Port 18 is removed from receiving any cells 14 of the linked list 10 is a stop pointer 26 set to point to the last cell of the linked list 10 where that Port is removed from it. See FIG. 3.

For exemplary purposes, next, port 1 reads twice and then port N reads the linked list 10 once. When port 1 reads the first time, the cell C1 is sent out port 1 and read pointer Ra1 is moved to cell C2 since that is where the cell pointer 20 of cell C1 points. Because the stop pointer Sa1 is not set to point to any cell 14, the read pointer is allowed to continue onto the next cell. Since the port 1 has read cell C1, the count 24 of cell C1 is decremented by 1 to reflect the fact that port 1 no longer will read cell C1 since it already has. Additionally, the bit 32 in the status field 34 of C1 is removed to also reflect the fact that the port 1 no longer will read cell C1, since it already has. Similarly, when port 1 is read again, cell C2 goes out port 1, its count 24 is decremented by one and its bit 32 in the status field 34 corresponding to port 1 is removed. The read pointer Ra1 for port 1 then points to cell C3 since cell C3 is the cell to which the cell pointer 20 points. The read pointer Wa is not changed since its count still reflects the fact that there are two ports that are associated with the linked list 10 and its reference status field shows these two ports to be port 1 and port N. Next, port N is read which causes cell C1 to be read out of port N, the bit 32 in the status field 34 of cell C1 corresponding to port N to be removed and the count 24 of cell C1 to be decremented by 1. The read pointer RaN is then moved to cell C2 since cell C2 is the cell 14 to which the cell pointer 20 of cell C1 points. Because the stop pointer SaN is not set to any cell, the pointer RaN moves to cell C2. See FIG. 4.

When port 2 is read, port 2 stops since the stop pointer Sa2 points to cell C1. This indicates that read pointer Ra2 is to stop reading cells 14 in linked list 10 when it points to cell C1. Then the read pointer Ra2 is changed to point to null. The cell C1 has its count reduced to 0 and the bit 32 of the status field 34 corresponding to port 2 removed. Since the count is 0, the status field shows no bits there are no ports still to receive cell C1 and the cell C1 is freed. See FIG. 5.

The presence of the stop pointer 26, which is set to the value of the write pointer at the point where a given port is removed from the multicast of the linked list 10, allows the number of ports that a connection to which a cell is going to be decreased. The stop pointer enables a port to be removed and the linked list 10 to recognize this fact. Similarly, in regard to the status field 34 of each cell, and the counter 24, when the counter 24 reaches 0 in a given cell 14, the cell 14 has been read by all the ports 18 and the memory location associated with the cell can be returned to a free list. In this way, to drop a port 18 from a multicast of a linked list 10, all that has to be done is to unset the bit 32 in the reference status field of the write pointer 22 which corresponds to a given port 18 but keep the old count value. When the next cell 14 is written to the linked list 10, it receives the new status field, but the old count value. Each new cell that arrives also receives the new status field and a count value equal to the number of bits 32 set in the status field 34. Once the status field is added, the full count value becomes redundant, one only needs to keep a count of the number of ports that are being dropped as of that cell. Most cells would have a count of 0. When one or more ports is dropped from the multicast their bits are unsent in the reference status field, and the next cell written to the list has the counter set to the number of ports being dropped. When a cell 14 is read out a port 18, it unsets its bit 32 in the status field 34. If both the status field 34 is empty and the counter 24 is 0, then the cell 14 can be freed. If a cell 14 is read out a port 18 and its bit 32 in the status field 34 was not set, then the counter 24 is decremented by 1 since it is one of the ports being dropped as of this cell, and as above if both the status field 34 is empty and the counter 24 is 0 then the cell 14 can be freed. Since the counter 24 that goes with each cell 14 now only needs to be large enough to count the maximum number of ports 14 that can be dropped as of a given cell 14, as opposed to the maximum number of ports 18 that a cell 14 could go to, it can be smaller. If the maximum number of ports 14 that can be dropped as of a given cell 14 is one then it becomes a one bit counter.

Once the status field 34 is added, the full count value becomes redundant. One only needs to keep a count of the number of ports that are being dropped as of that cell. Most cells would have a count of 0. When one or more ports is dropped from the multicast their bits are unset in the reference status field, and the next cell 14 written to the linked list 10 has it count 24 set to the number of ports being dropped. When a cell is read out a port 18 it unsets its corresponding bit in the status field 34. If both the status field 34 is empty and the count 24 is 0 then the cell can be freed.

If a cell 14 is read out a port 18 and its bit in the status field 34 was not set, then the cell 14 has its count 24 decremented by one since it is one of the ports being dropped as of this cell 14. As above, if both the status field 34 is empty and the counter is 0 then the cell 14 can be freed. Since the count 24 that goes with each cell 14 now only needs to be large enough to count the maximum number of ports that a cell could go to, it can be made smaller. If the maximum number of ports that can be dropped as of a given cell is one then it becomes a one bit counter. When a port is indicated as being dropped, and since there is only one port that can be dropped at a time, then the port being dropped must be that port. If ports 14 are not to be removed from reading the linked list 10, than the stop pointers 26 can be eliminated and just the status field needs to be present.

In yet another alternative embodiment, a cell 14 can have two types of status fields. The need for a count 24 or a corresponding stop pointer 26 is then eliminated. Of these two types of status fields, there is a status field 34 as described above. There is also a status field that has bits which identify whether the cell is the last cell to be read by a port (thus acting like a stop pointer). It can be established in the protocol of the system 28 that the cell 14 is also read if it is the last cell to be read for the corresponding port 18. Or, it can be established the cell is not to be read when it is identified through the additional status field to be the last cell associated with a corresponding port 18. Status fields have the advantage of simply adding or removing bits, as compared with counters which require subtraction in their operation and are thus more complex, relatively speaking. Whether logic constraints or memory constraints are more important determines the ultimate configuration.

The multicast of the linked list 10 is accomplished with system 28 as shown in FIG. 6, which is a schematic representation of the system 28. The system 28 is comprised of a scheduler 36. The scheduler 36 decides which connection should be read by some scheduling algorithm such as the round robin, weighted round robin, weighted fair queuing, virtual clock, etc. Each time a controller 38 desires to send a cell 14 out of a port 18, given the identity of the connections with cells 14 in the linked list 10, the scheduler 36 is called upon. The controller 38 updates the general connection information, manages the list of free cell locations (the "free list"), informs the scheduler 36 about the status of connections based on information it receives from read controller 40 and write controller 42, and instructs the read controller 40 which connections to read. The read controller 40, given a port number and a connection number, reads the next cell for that connection on the given port.

The system 28 is comprised of a general connection information memory 44. As shown in FIG. 7, the general connection information contains pointers to the read and write information entries if they are not either adjacent to the general connection information in the same memory or at the same address if they are in different memories. The "port field" and "port count" entries, if used, may reside with the general connection information or with a connection write information (if both exist, then they may both be with either the general information or the write information, or one might be with each).

The write controller 42 of the system 28 receives cells from input and writes them to cell memory 46 (see FIG. 8 and FIG. 9), and updates the connection write information, gets cells 14 from and returns cells to the free list (managed by the controller 38 ), informs the controller. 38 when a new cell 14 arrives for a connection, and what connection it arrived for. In FIG. 8 and 9, the cell 14 and its data can either be stored together in one memory or separately in different memories, with each item of data at the same address (where the addressing is by data item). The "different memories" can be physically separate (different chips), or logically separate (different regions of the same memory, or even interleaved i.e. all even numbered (word or data item) addresses 0, 2, 4. . are in "memory" A, and all odd numbered addresses 1, 3, 5, 7 are in "memory" B, where item "i" would be stored at physical address 2* i if it were in logical "memory" A, and at physical address (2* i)+1 if it were in logical "memory" B).

The system 28 is comprised of a connection write information memory 48, as shown in FIG. 10. The connection write information contains the pointer to either the last cell 14c in the linked list 10 for that connection or the location where the next cell 14 for that connection will be written (depending on whether or not the read pointer 16 optimization is performed). It also contains any of the "port field" or "port count" field which are needed but not contained in the general connection information.

Figure 21:
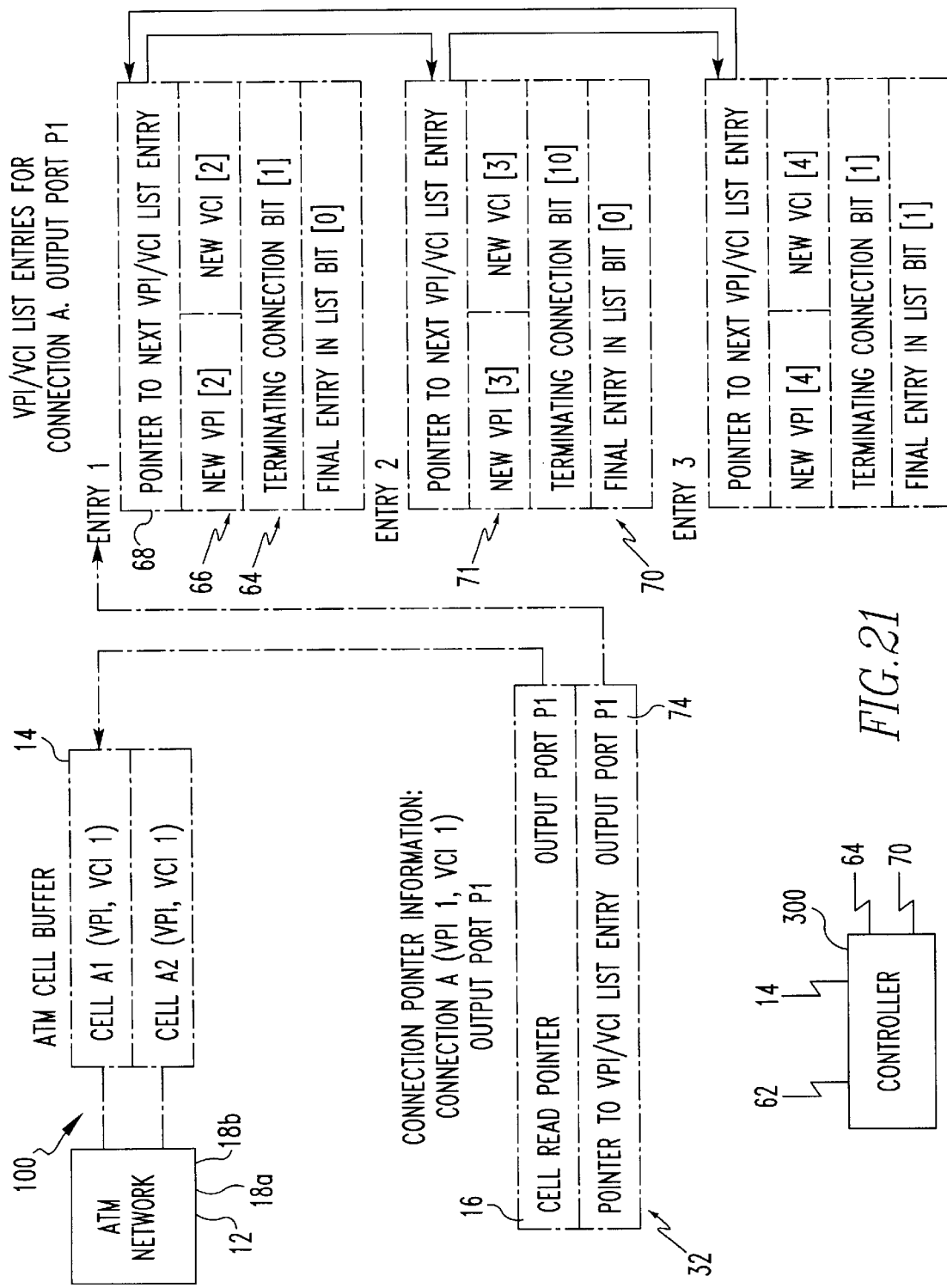
FIG. 21 provides an example of the steps that occur during the multicast of an ATM cell to multiple VPI/VCIs.

The system 28 is also comprised of a connection read information memory 50, as shown in FIGS. 11 and 12. The connection read information has an entry for each port 18 which has a pointer to the cell 14 in the linked list 10. This cell 14 will be read out for that port 18 the next time this connection should send a cell 14 out the given port 18. Each entry will contain a stop pointer 26 if needed. Each entry has additional information such as a new header, since a connection might need a different VPI or VCI for each port 18 that it exits. If the connection read entries are stored separately, then there will be an array which is indexed by port number which contains pointers to the connection read entries for each port 18. As described in FIGS. 7, 10, 11, 12, 13, 14, 15, 16 and 17, the various memories may be physically separate, or they may be logical memories in one or more physical memories. In regard to these figures, they have the following nomenclature:

(3 & 4) only needed if read/write information is not stored adjacent to the connection entry in the same memory or stored in different memories in different locations (4) if the read information entries for different ports are stored together, then the read information pointer can point to one of them (5) if needed Referring to FIG. 21, there is shown a multicast system 100 for an ATM network 12. The multicast system 100 comprises at least a first ATM cell pointer mechanism 62.

The multicast system 100 is also comprised of at least a first ATM cell 14a having data. The first ATM cell pointer mechanism 62 points to the first ATM cell 14a. The multicast system 100 is additionally comprised of a first node 64 having a first address 66 for the first ATM cell 14a and a node address pointer 68. The first ATM cell pointer mechanism 62 points to the first node 64. The multicast system 100 is comprised of a second node 70 having a second address 71 for the first ATM cell 14a. The node address pointer 68 of the first node 64 points to the second node 70. The first and second nodes form a linked list 72 of addresses. The multicast system 100 preferably is also comprised of a controller 300 in communication with the first ATM cell pointer mechanism 62, the first node 64 and the second node 70. The controller 300 causes the first ATM cell 14a to be transmitted out a port 18 to the first address 66 and then to the second address 71.

The first ATM cell pointer mechanism 62 preferably includes a first cell read pointer 16 pointing to the first ATM cell 14a. The first ATM cell pointer mechanism 62 preferably also includes an address pointer 74 which points to the node in the linked list 72 of addresses whose address is the address where the first ATM cell 14a is to go.

Preferably, each node of the linked list 72 of addresses comprises new VPI information, new VCI information, a terminating connection indication bit and a final entry in the linked list of addresses indication bit. Preferably, if the terminating indication bit in the node is set and the address pointer 74 is pointing to the node, then the first ATM cell 14a is caused to be transmitted by the controller 300 with the VPI and VCI information in the node, otherwise the first ATM cell 14a is transmitted with only the VPI information from the node. If the final entry in the linked list of addresses is set in the node, then preferably after the first ATM cell 14a is transmitted, the first cell read pointer 16a is caused by the controller 300 to point to a second ATM cell 14b.

The present invention pertains to a method for multicasting an ATM cell 14. The method comprises the steps of reading a first node 64 having a first address 66 to which a first ATM cell 14a is to be sent. Then there is the step of transmitting the first ATM cell 14a out a port 18 to the first address 66. Next there is the step of reading a second node 70 having a second address 71 to which the first ATM cell 14a is to be sent. Then there is the step of transmitting the first ATM cell 14a out the port 18 to the second address 71.

The following table provides an example of cells transmitted and corresponding changes to the pointers in regard to FIG. 21. In the table, the address pointer 74 is called a pointer to VPI/VCI list entry and the node address pointer 68 is called a pointer to next VPI/VCI list entry.

TABLE

| 1. | Cell A1 transmitted with VPI 2, VCI 2 | Pointer to VPI/VCI List Entry changed to point to ENTRY 2 |
|---|---|---|
| 2. | Cell A1 transmitted with VPI 3, VCI i | Pointer to VPI/VCI List Entry changed to point to ENTRY 3 |
| 3. | Cell A1 transmitted with VPI 4, VCI 4 | Pointer to VPI/VCI List Entry changed to point to ENTRY 1 Cell Read Pointer changed to point to CELL A2 |
| 4. | Cell A2 transmitted with VPI 2, VCI 2 | Pointer to VPI/VCI List Entry changed to point to ENTRY 2 |

TABLE-continued

| 5. | Cell A2 transmitted with VPI 3, VCI 1 | Pointer to VPI/VCI List Entry changed to point to ENTRY 3 |
|---|---|---|
| 6. | Cell A2 transmitted with VPI 4, VCI 4 | Pointer to VPI/VCI List Entry changed to point to ENTRY 1 |

Preferably, before the reading the second node 70 step, there is the step of reading a node address pointer 68 associated with the first node 64 which points to the second node 70. The first and second nodes form a linked list 72 of addresses. Before the reading the first node 64 step, there is preferably the step of reading a first ATM cell read pointer 16a which points to the first ATM cell 14a. Before the reading the first node 64 step, there is the step of reading an address pointer 74 to the first node 64.

Before the transmitting step, there can be the step of inserting a new VPI and VCI into the first ATM cell 14a if the first address 66 is a terminating address, otherwise, the first ATM cell 14a is transmitted with only the VPI information from the first node 64. After the step of reading the address pointer 74 pointing to the first node 64, there can be the step of pointing the address pointer 74 to the second node 70.

After the step of transmitting the first ATM cell 14a to the second address 71, there are preferably the steps of transmitting the first ATM cell 14a out the first port 18 sequentially to additional addresses and additional nodes and the linked list 72 of addresses until a node is reached which is a final entry in the linked list 72 of addresses. Then there is the step of pointing the ATM cell read pointer 14 to a second ATM cell 14b. Next there is the step of pointing the address pointer 74 to the first node 64 of the linked list 72 of addresses.

The present invention pertains to a method for multicasting ATM cells 14. The method comprises the steps of reading a first ATM cell 14a to which a first ATM cell read pointer 16a is pointing. Then there is the step of transmitting the first ATM cell 14a out a first port 18a to a first address 66. Next there is the step of determining whether the first ATM cell 14a is to be transmitted out the first port 18a to a second address 71. Next there is the step of reading a cell pointer 20 pointing to a second ATM cell 14b if the transmission of the first ATM cell 14a out the first port 18 to addresses is completed. Preferably, the first ATM cell includes a cell pointer 20 and a reading a cell pointer 20 step includes the step of reading the cell pointer 20 of the first ATM cell 14a which points to the second ATM cell 14b. After the step of reading the cell pointer 20, there can be the step of reading the second ATM cell 14b. Preferably, after the step of reading a node address pointer 68, there is the step of reading the second address 71 of the second node 70.

Figure 22:
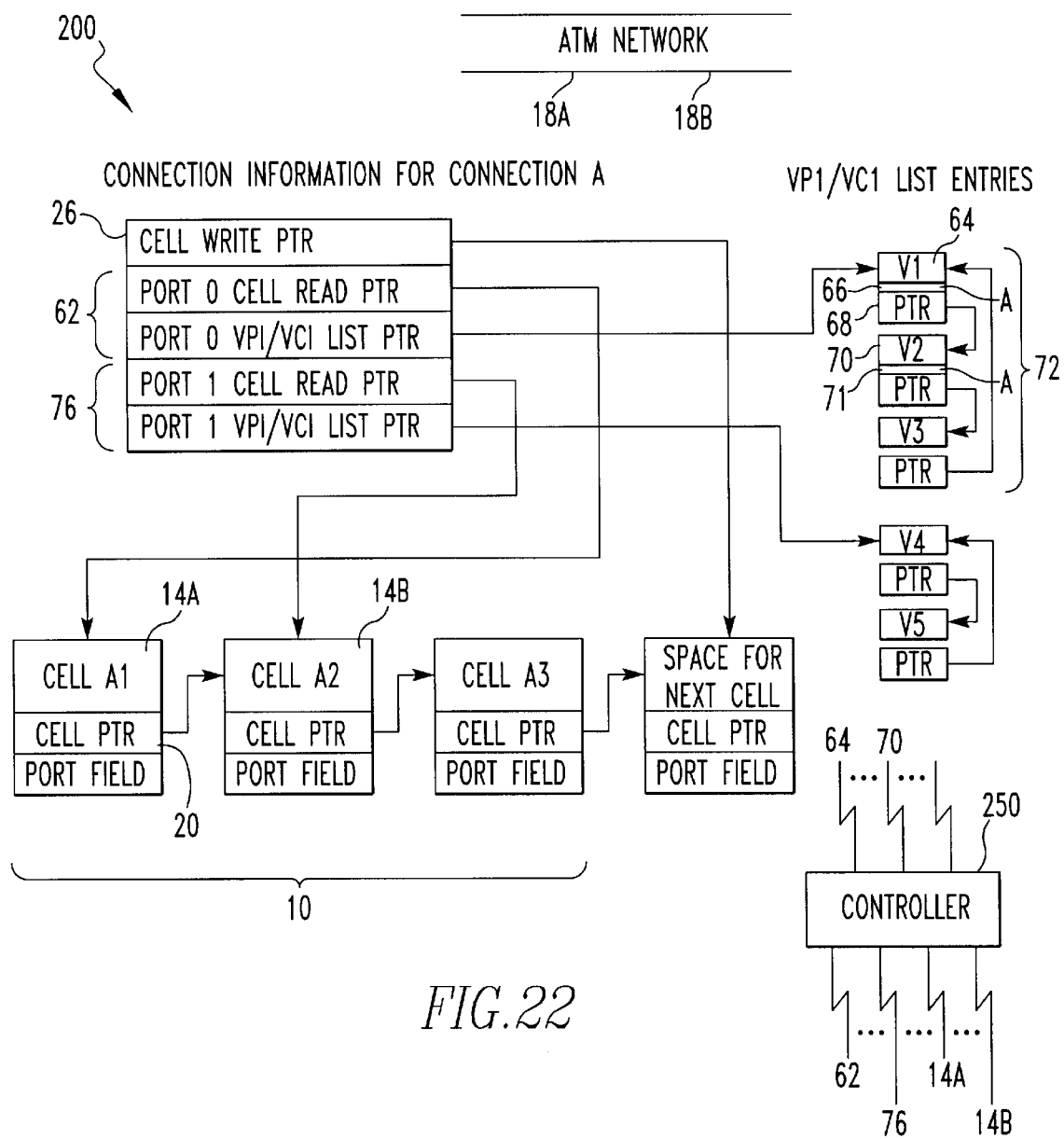
FIG. 22 is a schematic representation of a multicast system for ATM cells involving multiple addresses and multiple ports.

The present invention pertains to a multicast system 200 for an ATM network 12, as shown in FIG. 22. The multicast system 200 is comprised of a first ATM cell pointer mechanism 62 associated with a first port 18a. The multicast system 200 also comprises at least a second ATM cell pointer mechanism 76 associated with a second port 18b. The multicast system 200 is also comprised of at least a first ATM cell 14a. The first ATM cell pointer mechanism 62 and the second ATM cell pointer mechanism 76 points to the first ATM cell 14a. There is a first node 64 having a first address 66 and a node address pointer 68. The first ATM cell pointer mechanism 62 points to the first node 64. There is a second node 70 having a second address 71. The node address pointer 68 of the first node 64 points to the second node 70. The first and second nodes form a linked list 72 of addresses. The first ATM cell 14a preferably has a cell pointer 20. The multicast system 200 preferably includes a second ATM cell 14b. The cell pointer 20 of the first ATM cell 14a points to the second ATM cell 14b. The first ATM cell 14a and second ATM cell 14b forms a linked list 10 of ATM cells 14. The multicast system 200 can include a controller 250 for controlling when a pointer is read and when an ATM cell 14 is transmitted out a port 18 and with which address. The controller 250 is in communication with the nodes, cells and pointers. The multicast system 200 preferably also includes a write pointer 26 pointing to a last ATM cell 14 in the linked list 10 of ATM cells 14.

Figure 18:
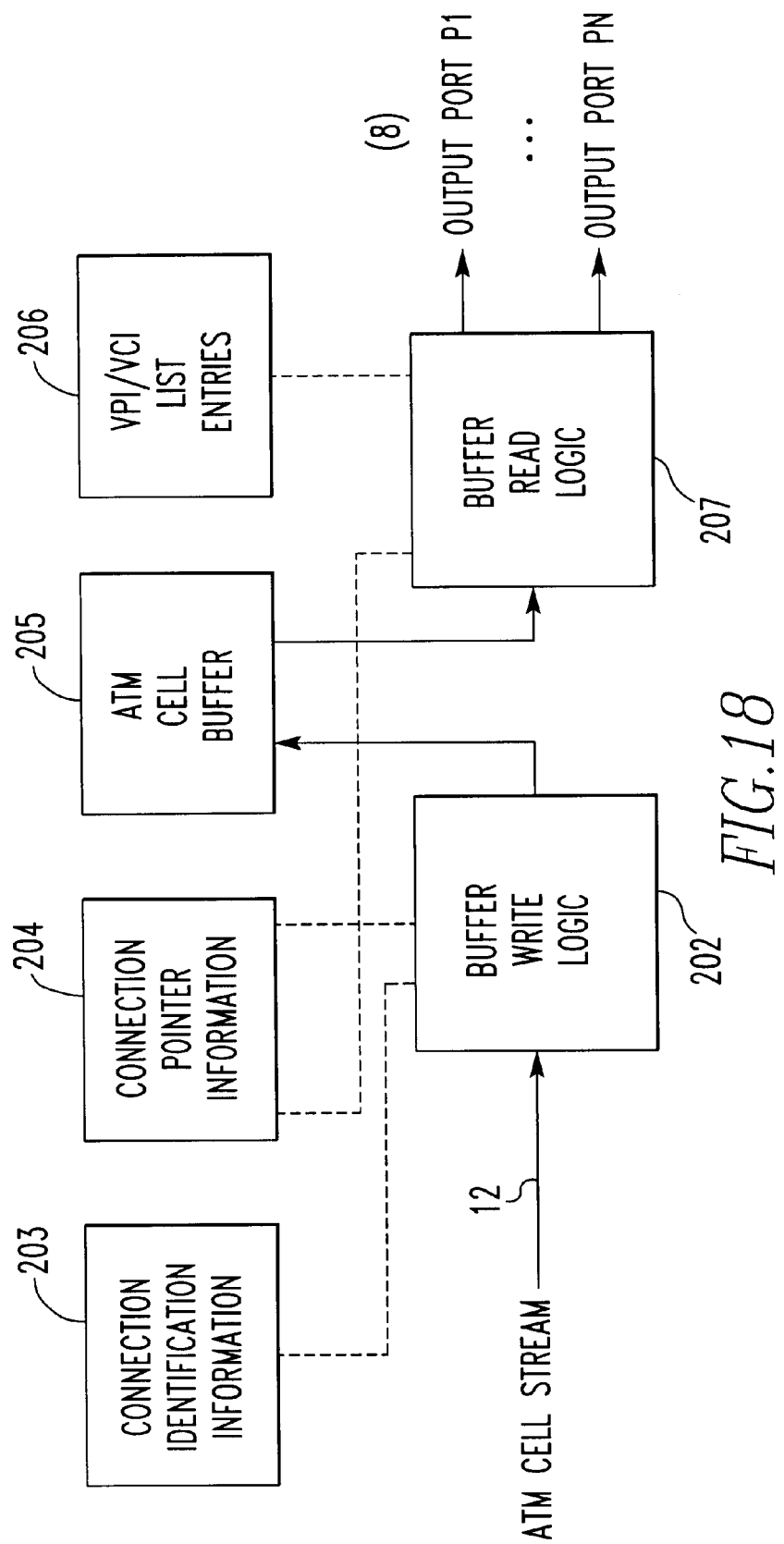
FIG. 18 shows a block diagram of an implementation involving the present invention. Cells from an ATM cell stream are multicast to multiple VPI/VCIs at one or more of the output ports.

In the operation of the preferred embodiment, an ATM cell is stored in the following manner. An ATM cell 14 from an ATM network 12 is received by buffer write logic 202, as shown in FIG. 18. The buffer write logic looks at the connection identification information 203 to determine the location of the connection pointer information 204 for the connection to which the ATM cell 14 belongs. It then writes the cell 14a single time to the ATM cell buffer 205 and updates the connection pointer information 204 to indicate the presence of the cell 14.

When an ATM cell 14 is to be read to a particular output port 18, the buffer read logic 207 looks at the connection pointer information 204 to find the address pointer 74 to the address linked list 72 for the given connection and output port 18. It uses the address pointer 74 to find a node within the address linked list 72.

If the node has the terminating connection indication bit 214 set, then the new VPI 212 and new VCI 213 from the node are inserted into the transmitted cell. Otherwise, only the new VPI 212 is inserted into the transmitted cell 14 (the VCI of the cell is left unchanged from the time when it arrived from the ATM cell network 12.

Once the correct VPI/VCI for the transmission of the cell 14 has been determined, the pointer to the address list 72 is then given the value stored in the pointer 68 of the node so that the next entry in the list 72 will be used for the next cell 14 transmission.

If the final entry indication bit 215 is set in a node, then the node address pointer 68 will point back to the first node 64 in the address linked list 72. After a cell 14 is transmitted using the final node in the address linked list 72, the ATM cell read pointer 16 in the connection pointer information 204 is updated to point to the next cell 14 in the ATM cell buffer 205 for the given connection.

The net result is that, if a given output port 18 of an ATM connection points to an address linked list with n entries, then each ATM cell 14 for that connection will be transmitted n times by that output port, with each transmission using the VPI (and possibly the VCI) stored in each subsequent entry of the address linked list 72.

In regard to adding or removing entries from an address linked list 72, the address linked list 72 for a given output port 18 of a connection consists of a circularly linked list, with each node address pointer 68 of a node pointing to the next node in the address linked list 72 and the final node pointing back to the first node 64 in the address linked list 72.

In order to ADD a node to an existing address linked list 72, the following steps must be performed:

1. Create a new node within the address linked list 72. This new node shall be identified as X.
2. Change the node address pointer 68 of node X to next node of node X so that it points to a node (which will be referred to as Y) which is already a member of the list to which node X is being added.

If node X is the only node in the address linked list 72, point the node to itself and set the final entry in VPI/VCI list indication bit 215 to 1.

3. In order to insert node X into the list, change the address node pointer 68 to the next node address pointer 68 of the node in the address linked list 72 that points to entry Y so that it points to entry X instead.

In order to remove a node from an existing address linked list 72, the following steps must be performed.

The entry being removed shall be referred to as entry B. The node which points to node B is referred to as node A. The node to which node B points is referred to as node C.

1. Change the address node pointer 68 of node A so that it points to node C rather than node B. If the final node in VPI/VCI list indication bit 215 of node B is set, then set the final node in VPI/VCI list indication bit 215 of node A.

2. In order to make sure that node B is no longer needed and can be destroyed, one must make sure that no address pointer 74 in the connection pointer information 204 for the given connection points to node B. This can be accomplished by one of two methods:

2a. Change any address pointer 74 that points to node B so that it points to node C, or 2b. Wait for a period of time long enough to insure that at least one cell ATM for the given connection has been transmitted by each output 18 of the connection. Whenever a cell 14 is transmitted, the address pointer 74 for the given output changes value, and once an address pointer 74 changes its value, it will never again point to node B, because node B is no longer a part of the address linked list 72.

By way of example showing utilization of multiple ports multiple address, and referring to FIG. 22, there are 3 cells stored for a connection A (cells A1, A2, and A3 and form a linked list 10 of cells). Each cell has a cell pointer 20 which points to the next cell of the same connection. The final cell points to a memory location where the next new cell for Connection A will be stored. Each cell contains some form of PORT FIELD, such as that described above, which keeps track of which ports 18 must read the cell before the memory space which the cell occupies can be used for a different purpose.

The cell write pointer 26 points to a memory location where the next incoming cell is to be placed. For this connection, Port 0 will transmit cell A1 (pointed to by the PORT 0 cell read pointer 16 ), followed by cell A2 and cell A3. Each cell will be transmitted three times—once with the address from VPI/VCI list entry V1 (pointed to by PORT 0 address pointer 74 ), once with the address from V2, and once with the address from V3 (V1, V2, and V3 form a complete address linked list).

The PORT 1 cell read pointer 16 points to cell A2. This means that transmission of cell A1 has already been completed for port 1. Port 1 will transmit the remaining cells (cells A2 and A3). . Each cell will be transmitted two times—once with the address from V4 and once with the address from V5. V4 and V5 form a linked list 72 of addresses.

Figure 23:
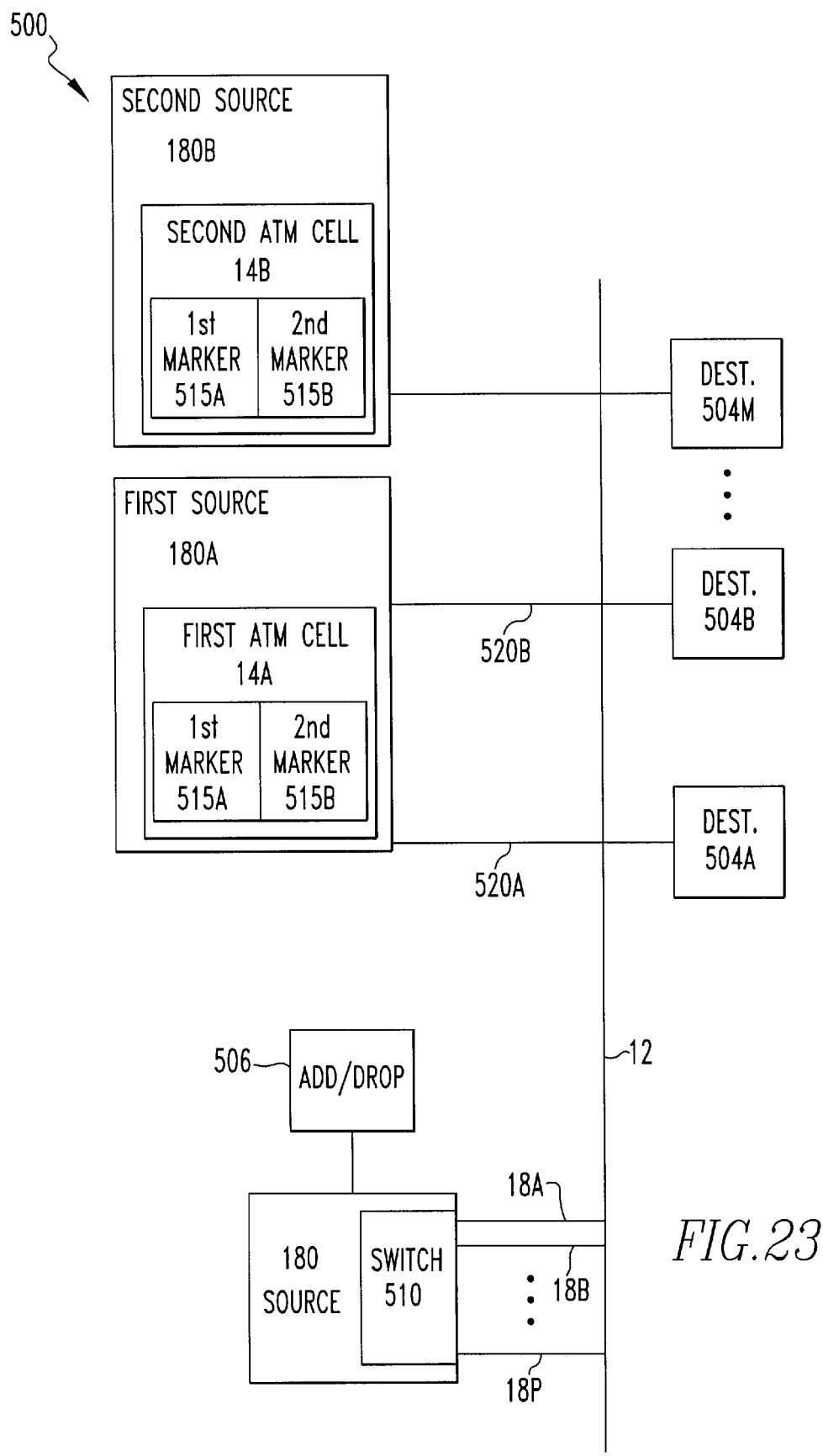
FIG. 23 is a schematic representation of a multicast system which can dynamically add or drop connections.

The present invention pertains to a multicast system 500, as shown in FIG. 23. The system 500 comprises an ATM network 12. The system 500 comprises a source 180 connected to the ATM network 12. The system 500 also comprises a first destination 504a connected to the ATM network 12. The system 500 comprises at least a second destination 504b connected to the ATM network 12. Additionally, the system 500 comprises a mechanism 506 for adding or dropping connections 520 dynamically between the first source 180 and any destinations at any time.

Preferably, the source 180 comprises a switch 510 having P ports 18, where P is greater than or equal to 1 and is a positive integer. The source 100, as shown in FIG. 1, preferably includes N ATM cells 14, where N is greater than or equal to 1 and is a positive integer. Preferably, the N ATM cells 14 form a linked list 72. The source 180 preferably includes a read pointer 16 associated with each port 18 that points to which ATM cell 14 of the N ATM cells 14 is to be transmitted through the port next. The source 180 also preferably includes a write pointer 22 that points to which ATM cell 14 of the N ATM cells 14 is a last ATM cell 14c of the linked list 72.

There are preferably M additional destinations 504 connected to the ATM network 12, where M is greater than or equal to 1 and is a positive integer. Preferably each destination 504 has an associated address. The system 12 also preferably comprises a memory mechanism 512 which includes a cell buffer.

The adding or dropping mechanism preferably includes a port status mechanism 514 which keeps track of the status of every port 18. The port status mechanism 514 preferably includes a 3-bit port status indicator 516 associated with each port 18. Preferably, each 3-bit port status indicator 516 has seven states defined with each state having a code and an associated port state as follows:

| Code | Port state |
| --- | --- |
| 000 | Port has been dropped |
| 001 | Port has been dropped and still present in rate controller |
| 010 | Port is being dropped and the cell buffer is not empty |
| 011 | Port is being dropped, the cell buffer is not empty, and the port is added again |
| 100 | Port is running with cells in the buffer |
| 101 | Port is running with cells in the buffer and a port drop command is issued |
| 110 | Port is added and running without cells in the buffer |

The present invention pertains to a method for multicasting ATM cells 14. The method comprises the steps of forming a first connection 520a between a first source 180a and a first destination 504a for transmitting a first ATM cell 14 a therebetween. Next, there is be step of forming a second connection 504b between the first source 180a and a second destination 504b while the first connection 520a exists. Then there is the step of terminating the first connection 520a while the second connection 504b exists.

Preferably, the terminating step includes the step of terminating the first connection 520a while the second connection 520b exists and there is still the first ATM cell 14a to be transmitted from the first source 180a.

Preferably, after the terminating step, there is the step of forming the first connection 520a again after it has been terminated while the second connection 520b exists. The forming the connection again step preferably includes the step of setting a read pointer 16 associated with the first source 180a to a write pointer 22 associated with at least the first source 180a. After the step of forming the second connection 504b, there is preferably the step of obtaining the first ATM cell 14a to be transmitted from the first source 180a.

Before the step of forming the first connection 504a again, there are preferably the steps of obtaining the second ATM cell 14b to be transmitted from the second source 180b. Next there is the step of linking the second ATM cell 14b to the first ATM cell 14a to form a linked list 72 of ATM cells 14. Preferably, after the step of obtaining the second ATM cell 14b, there are the steps of transmitting the second ATM cell 14b from the second source 180b. There is the step of preventing the second ATM cell 14b from being transmitted from the first source 180a.

After the step of obtaining the second ATM cell 14b, there is the step of setting a first marker 515a of the second ATM cell 14b for the second source 180b to a first state which indicates the second ATM cell 14b is to be transmitted out the second source 180b. The preventing step preferably includes the step of setting a second marker 515b of the second ATM cell 14b for the first source 180a to a second state which indicates the second ATM cell 14b is not to be transmitted out the first source 180a.

The step of setting a first marker 515a includes the step of setting a status field bit to 1 and the second ATM cell 14b which corresponds to the second source 180b. The step of setting a second marker 525b preferably includes the step of setting a status field bit to 0 in the second ATM cell which corresponds to the first source.

The present invention pertains to a method for multicasting ATM cells 14. The method comprises the steps of forming a first connection 504a between a first source and a first destination. Next there is the step of obtaining a first ATM cell to the transmitted out the first source. Next there is the step of forming a second connection between a first source and a second destination while the first connection exists and after the first ATM cell has been obtained.

In the operation of the preferred embodiment, in ATM networks, each multicast connection has a per-VC cell queue and each port 18 in that connection has its own cell read pointer 16 (the head of the cell link list) and a shared cell write pointer 22 (the tail of the cell link list). Each cell 14 has a cell status field 34 in which each bit represents a port 18. A status field bit is set to one when the cell 14 is valid for that port 18 and is not being read. A status port bit is set to zero when the cell 14 is not valid or is being read out. A cell 14 can be freed when all the status field bits are set to zeros. Each connection keeps a master port status to indicate the existing port.

A free cell 14 is reserved when the first port 18a of a multicast connection is setup. The cell read pointer 16 and write pointer 22 are pointed to the free cell 14. A cell 14 is freed when the last port 18 of a multicast connection is dropped. A port drop operation is not being executed immediately when there are cells 14 in the queue for that port. The per-port cell queue is empty when the read pointer 16 of that port 18 is the same as the write pointer 22 or the read pointer 16 of that port 18 points to a cell which has the cell status bit set to zero.

A rate controller is a special mechanism to schedule the connections. A multicast connection which presents in the rate controller might not be dropped immediately even though it has an empty cell buffer. It is removed from the rate controller only when the connection is being scheduled and the cell buffer is empty and the port is being dropped.

To maintain a per-VC per-port status, a three-bit port status indicator 516 is stored for every port 18 of the multicast connection. Considering that the multicast connection might be in a different state when a port add/drop operation occurs, the per-port per-VC status information needs to be maintained. There are 7 possible states for each port each multicast VC:

TABLE 1

Port status

| Code | Port state |
| --- | --- |
| 000 | Port has been dropped |
| 001 | Port has been dropped and still present in rate controller |
| 010 | Port is being dropped and the cell buffer is not empty |
| 011 | Port is being dropped, the cell buffer is not empty, and the port is added again |
| 100 | Port is running with cells in the buffer |
| 101 | Port is running with cells in the buffer and a port drop command is issued |
| 110 | Port is added and running without cells in the buffer |

At each state, different operations take place when different events happen (all the events are related to the specific port);

1. Port has been dropped (state 000)

When there is a new cell 14 arriving for this multicast connection (for other ports 18), the cell 14 should

TABLE 2

Port state 000

| Events | Next state | Operations |
| --- | --- | --- |
| new cell arrival | 000 | store cell without this port |
| Port addition issued | 110 | initialize cell link list |
| Port drop issued | 000 | no action | not be accepted for this port 18 since it has been dropped. This is enforced by setting the status field bit to zero in the new cell 14. When a port 18 addition operation is issued, the master status field bit is set to one, the read pointer 16 is set to the current write pointer 22, and the status is modified to 110. When a port 18 drop command is issued, no operation takes place since the port 18 has already been dropped.

2. Port is being dropped with non-empty buffer (state 010)

When a new cell 14 arrives, the cell 14 should not be accepted for this port 18 since it is being dropped.

| Events | Next state | Operations |
| --- | --- | --- |
| new cell arrival | 010 | store cell without this port |
| Port addition issued | 011 | no action |
| Port drop issued | 010 | no action |
| Send non-last cell | 010 | no action |
| Send last cell | 000 for non rate-controlled VC; 001 for rate-controlled VC | no action |

This is enforced by setting the status field bit to zero in the new cell 14. When a port 18 addition operation is issued, the status is changed to "port is being dropped with non-empty buffer and added again" (011). No further action is taken until all the remaining cells 14 are drained. If a port drop operation is issued or a non-last cell 14 is read, no action is needed. When the last cell is being sent, the status is changed to "port has been dropped (000)" for non rate controlled VC and "port is being dropped but in the rate controller (001)" for rate controlled VC. The last cell is detected when the current cell status field bit is zero.

3. Port is being Dropped with non-empty buffer and Added again (state 011)

When a new cell 14 arrives, the cell 14 should not be accepted for this port 18 since it is being dropped and not ready to accept new cells even though the port 18 is added again. This is enforced by setting the status field bit to zero in the new cell 14. When a port addition operation is issued, no further action is needed since there is already a port addition operation pending. If a port drop command is issued, the status is updated to "port is being dropped with non-empty buffer (010)" and no further action is needed. Basically, the last port addition is offset by the last port drop operation. If a non-last cell is read, no action is needed. When the last cell is being sent, the status is changed to "port is running without cell (110)" and the read pointer 16 is pointed to the current write pointer 22. The last cell is detected when the current cell status field bit is zero.

| Events | Next state | Operations |
| --- | --- | --- |
| new cell arrival | 011 | store cell without this port |
| Port addition issued | 011 | no action |
| Port drop issued | 010 | no action |
| Send non-last cell | 011 | no action |
| Send last cell | 110 | read pointer set to write pointer |

4. Add/Running without Cell (state 110)

When a new cell 14 arrives, the cell should be accepted for this port 18. This is enforced by setting the status field bit to one in the new cell 14. The status is changed "port is running with cells (100)". When a port addition operation is issued, no further action is needed. If a port drop command is issued, the status is updated to "port has been dropped (000)" for the non rate-controlled VC and "port is being dropped in the rate controller (001)" for the rate-controlled VC, respectively.

| Events | Next state | Operations |
| --- | --- | --- |
| new cell arrival | 100 | store cell |
| Port addition issued | 110 | no action |
| Port drop issued | 000 for non rate-controlled VC; 001 for rate-controlled VC | no action |

5. Running with Cell (state 100)

When a new cell 14 arrives, the cell 14 should be accepted for this port 18. This is enforced by setting the

| Events | Next state | Operations |
| --- | --- | --- |
| new cell arrival | 100 | store cell |
| Port addition issued | 100 | no action |
| Port drop issued | 101 | no action |
| Send non-last cell | 100 | no action |
| Send last cell | 110 | no action | status field bit to one in the new cell 14. When a port addition operation is issued, no further action is needed. If a port drop command is issued, the status is updated to "port is running with cells/drop (101)" and no further action is needed. If a non-last cell is read, no action and status update is needed. When the last cell is being sent, the status is changed to "port is running without cell (110)". The last cell is detected when the next read pointer is equal to the write pointer.

6. Running with Cell/Drop (101)

When a new cell 14 arrives, the cell 14 should not be accepted for this port 18 since it is being dropped.

| Events | Next state | Operations |
| --- | --- | --- |
| new cell arrival | 010 | store cell without this port |
| Port addition issued | 100 | no action |
| Port drop issued | 101 | no action |
| Send non-last cell | 101 | no action |
| Send last cell | 000 for non rate-controlled VC; 001 for rate controlled VC | no action |

This is enforced by setting the status field bit to zero in the new cell 14. When a port addition operation is issued, the status is changed to "port is running with cells" (100). If a port drop is issued or a non-last cell is read, no action and status update is needed. When the last cell is being sent, the status is changed to "port has been dropped (000)" for non rate controlled VC and "port is being dropped but in the rate controller (001)" for rate controlled VC, respectively. The last cell 14 is detected when the current cell status field bit is zero.

7. Dropped but still in the rate controller (state 001)

When there is a new cell 14 arriving for this multicast connection (for other ports), the cell 14 should

| Events | Next state | Operations |
| --- | --- | --- |
| new cell arrival | 001 | store cell without this port |
| Port addition issued | 110 | Update read/write pointer |
| Port drop issued | 001 | no action |
| Scheduled | 000 | delete from rate controller | not be accepted for this port 18 since it has been dropped. This is enforced by setting the status field bit to zero in the new cell. When a port addition operation is issued, the master status field bit is set to one, the read pointer is set to the current write pointer, and the status is modified to 110. When a port drop command is issued, no operation is taken place since the port has already been dropped. When the port 18 is scheduled by the rate controller, the port 18 is dropped completely and the status is changed to "000" (port has been dropped).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for multicasting ATM cells comprising the steps of:

forming a first connection between a first source and a first destination for transmitting a first ATM cell therebetween;

forming a second connection between the first source and a second destination while the first connection exists;

obtaining the first ATM cell to be transmitted from the first source;

obtaining a second ATM cell to be transmitted from a second source;

setting a first marker of the second ATM cell for the second source to a first state which indicates the second ATM cell is to be transmitted out the second source;

preventing the second ATM cell from being transmitted from the first source;

linking the second ATM cell to the first ATM cell to form a linked list of ATM cells;

transmitting the first ATM cell from the first source and the second ATM cell from the second source to the first destination and the second destination;

terminating the first connection while the second connection exists and there is still the first ATM cell to be transmitted from the first source; and forming the first connection again after it has been terminated while the second connection exists.

2. A method as described in claim 1 wherein the preventing step includes the step of setting a second marker of the second ATM cell for the first source to a second state which indicates the second ATM cell is not to be transmitted out the first source.

3. A method as described in claim 2 wherein the step of setting a first marker includes the step of setting a status field bit to 1 in the second ATM cell which corresponds to the second source.

4. A method as described in claim 3 wherein the step of setting a second marker includes the step of setting a status field bit to 0 in the second ATM cell which corresponds to the first source.

5. A method as described in claim 4 wherein the forming the connection again step includes the step of setting a read pointer associated with the first source to a write pointer associated at least the first source.

6. A multicast system comprising:

an ATM network;

a source connected to the ATM network, the source includes N ATM cells, where N is greater than or equal to 2 and is a positive integer, the N ATM cells form a linked list; a switch having P ports, where P is greater than or equal to 1 and is a positive integer; a memory mechanism, the source includes a read pointer associated with each port that points to which ATM cell of the N ATM cells is to be transmitted through the associated port next, and a write pointer that points to which ATM cell of the N ATM cells is a last ATM cell of the linked list;

a first destination connected to the ATM network;

at least a second destination connected to the ATM network and including M additional destinations connected to the ATM network, where M is greater than or equal to 1 and is a positive integer, wherein each destination has an associated address;

a controller for transmitting the N ATM cells to the first destination and the second destination; and a mechanism for adding or dropping connections dynamically between the source and any destinations at any time, the adding or dropping mechanism includes a port status mechanism which keeps track of the status of every port, the port status mechanism includes a 3-bit port status indicator associated with each port.

7. A multicast system as described in claim 6 wherein each 3-bit port status indicator has seven states defined with each state having a code and an associated port state as follows:

| | |
|---|---|
| 000 | Port has been dropped |
| 001 | Port has been dropped and still present in rate controller |
| 010 | Port is being dropped and the cell buffer is not empty |
| 011 | Port is being dropped, the cell buffer is not empty, and the port is added again |
| 100 | Port is running with cells in the buffer |
| 101 | Port is running with cells in the buffer and a port drop command is issued |
| 110 | Port is added and running without cells in the buffer. |

* * * * *